(12) United States Patent
Bai et al.

(10) Patent No.: US 11,895,668 B2
(45) Date of Patent: Feb. 6, 2024

(54) UPLINK POWER CHANGE CAPABILITY INDICATION

(71) Applicant: QUALCOMM Incorporated, San Diego, CA (US)

(72) Inventors: Tianyang Bai, Somerville, NJ (US); Yan Zhou, San Diego, CA (US); Ruhua He, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/451,069

(22) Filed: Oct. 15, 2021

(65) Prior Publication Data

US 2022/0240292 A1 Jul. 28, 2022

Related U.S. Application Data

(60) Provisional application No. 63/141,058, filed on Jan. 25, 2021.

(51) Int. Cl.
*H04W 72/23* (2023.01)
*H04W 52/14* (2009.01)

(52) U.S. Cl.
CPC .......... *H04W 72/23* (2023.01); *H04W 52/146* (2013.01)

(58) Field of Classification Search
CPC ............................ H04W 72/23; H04W 52/146
See application file for complete search history.

(56) References Cited

U.S. PATENT DOCUMENTS

2020/0350970 A1* 11/2020 Liu ................... H04B 7/0628
2022/0201679 A1* 6/2022 Lim .................... H04W 72/23

\* cited by examiner

*Primary Examiner* — Ronald B Abelson
(74) *Attorney, Agent, or Firm* — MG-IP Law, P.C.

(57) ABSTRACT

In an aspect, a user equipment (UE) transmits, to a base station, an uplink (UL) power change capability indication. The base station receives the UL power change capability indication, and transmits, to the UE, scheduling information for one or more UL transmissions that include one or more UL power changes based on the UL power change capability indication.

28 Claims, 8 Drawing Sheets

UPLINK POWER CHANGE CAPABILITY INDICATION

CROSS-REFERENCE TO RELATED APPLICATIONS

The present Application for Patent claims the benefit of U.S. Provisional Application No. 63/141,058, entitled "UPLINK POWER CHANGE CAPABILITY INDICATION," filed Jan. 25, 2021, assigned to the assignee hereof, and expressly incorporated herein by reference in its entirety.

BACKGROUND OF THE DISCLOSURE

1. Field of the Disclosure

Aspects of the disclosure relate generally to wireless communications, and more particularly, to an uplink power change capability indication.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes: transmitting, to a base station, an uplink (UL) power change capability indication; and receiving, from the base station, scheduling information for one or more UL transmissions that include one or more UL power changes based on the UL power change capability indication.

In some aspects, the UL power change capability indication is transmitted via radio resource control (RRC) signaling.

In some aspects, the method includes transmitting, to the base station, a UL beam switch capability indication, wherein the UL beam switch capability indication is different than the UL power change capability indication.

In some aspects, the UL power change capability indication indicates a number of UL power changes that the UE is capable of performing during a given period of time.

In some aspects, the given period of time corresponds to a slot.

In some aspects, the slot is associated with a tone spacing, and the number of UL power changes that the UE is capable of performing during the slot scales inversely with respect to the tone spacing.

In some aspects, the UL power change capability indication is defined per component carrier (CC).

In some aspects, the UL power change capability indication comprises a first UL power change capability indication associated with a first CC operating in accordance with a first tone spacing, and a second UL power change capability indication associated with a second CC operating in accordance with a second tone spacing that is different than the first tone spacing.

In some aspects, the UL power change capability indication is defined per a group of component carriers (CCs).

In some aspects, each CC in the group of CCs is associated with the same tone spacing.

In some aspects, the UL power change capability indication is transmitted in association with an Attach procedure between the UE and the base station.

In some aspects, the method includes receiving, from the base station, a request for the UL power change capability indication, wherein the UL power change capability indication is transmitted in response to the request.

In some aspects, the one or more UL power changes are associated with different channels of the same beam.

In some aspects, the different channels comprise a physical uplink control channel (PUCCH) and a physical uplink shared channel (PUSCH) over the same beam to a given transmission reception point (TRP), or the different channels are associated with different TRPs over the same beam.

In an aspect, a method of operating a base station includes: receiving, from a user equipment (UE), an uplink (UL) power change capability indication; and transmitting, to the UE, scheduling information for one or more UL transmissions that include one or more UL power changes based on the UL power change capability indication.

In some aspects, the UL power change capability indication is received via radio resource control (RRC) signaling.

In some aspects, the method includes receiving, from the UE, a UL beam switch capability indication, wherein the UL beam switch capability indication is different than the UL power change capability indication.

In some aspects, the UL power change capability indication indicates a number of UL power changes that the UE is capable of performing during a given period of time.

In some aspects, the given period of time corresponds to a slot.

In some aspects, the slot is associated with a tone spacing, and the number of UL power changes that the UE is capable of performing during the slot scales inversely with respect to the tone spacing.

In some aspects, the UL power change capability indication is defined per component carrier (CC).

In some aspects, the UL power change capability indication comprises a first UL power change capability indication associated with a first CC operating in accordance with a first tone spacing, and a second UL power change capability indication associated with a second CC operating in accordance with a second tone spacing that is different than the first tone spacing.

In some aspects, the UL power change capability indication is defined per a group of component carriers (CCs).

In some aspects, each CC in the group of CCs is associated with the same tone spacing.

In some aspects, the UL power change capability indication is received in association with an Attach procedure between the UE and the base station.

In some aspects, the method includes transmitting, to the UE, a request for the UL power change capability indication, wherein the UL power change capability indication is received in response to the request.

In some aspects, the one or more UL power changes are associated with different channels of the same beam.

In some aspects, the different channels comprise a physical uplink control channel (PUCCH) and a physical uplink shared channel (PUSCH) over the same beam to a given transmission reception point (TRP), or the different channels are associated with different TRPs over the same beam.

In an aspect, a user equipment (UE) includes: a memory; at least one transceiver; and at least one processor communicatively coupled to the memory and the at least one transceiver, the at least one processor configured to: transmit, to a base station, an uplink (UL) power change capability indication; and receive, from the base station, scheduling information for one or more UL transmissions that include one or more UL power changes based on the UL power change capability indication.

In some aspects, the UL power change capability indication is transmitted via radio resource control (RRC) signaling.

In some aspects, the at least one processor is further configured to: transmit, to the base station, a UL beam switch capability indication, wherein the UL beam switch capability indication is different than the UL power change capability indication.

In some aspects, the UL power change capability indication indicates a number of UL power changes that the UE is capable of performing during a given period of time.

In some aspects, the given period of time corresponds to a slot.

In some aspects, the slot is associated with a tone spacing, and the number of UL power changes that the UE is capable of performing during the slot scales inversely with respect to the tone spacing.

In some aspects, the UL power change capability indication is defined per component carrier (CC).

In some aspects, the UL power change capability indication comprises a first UL power change capability indication associated with a first CC operating in accordance with a first tone spacing, and a second UL power change capability indication associated with a second CC operating in accordance with a second tone spacing that is different than the first tone spacing.

In some aspects, the UL power change capability indication is defined per a group of component carriers (CCs).

In some aspects, each CC in the group of CCs is associated with the same tone spacing.

In some aspects, the UL power change capability indication is transmitted in association with an Attach procedure between the UE and the base station.

In some aspects, the at least one processor is further configured to: receive, from the base station, a request for the UL power change capability indication, wherein the UL power change capability indication is transmitted in response to the request.

In some aspects, the one or more UL power changes are associated with different channels of the same beam.

In some aspects, the different channels comprise a physical uplink control channel (PUCCH) and a physical uplink shared channel (PUSCH) over the same beam to a given transmission reception point (TRP), or the different channels are associated with different TRPs over the same beam.

In an aspect, a base station includes: a memory; at least one transceiver; and at least one processor communicatively coupled to the memory and the at least one transceiver, the at least one processor configured to: receive, from a user equipment (UE), an uplink (UL) power change capability indication; and transmit, to the UE, scheduling information for one or more UL transmissions that include one or more UL power changes based on the UL power change capability indication.

In some aspects, the UL power change capability indication is received via radio resource control (RRC) signaling.

In some aspects, the at least one processor is further configured to: receive, from the UE, a UL beam switch capability indication, wherein the UL beam switch capability indication is different than the UL power change capability indication.

In some aspects, the UL power change capability indication indicates a number of UL power changes that the UE is capable of performing during a given period of time.

In some aspects, the given period of time corresponds to a slot.

In some aspects, the slot is associated with a tone spacing, and the number of UL power changes that the UE is capable of performing during the slot scales inversely with respect to the tone spacing.

In some aspects, the UL power change capability indication is defined per component carrier (CC).

In some aspects, the UL power change capability indication comprises a first UL power change capability indication associated with a first CC operating in accordance with a first tone spacing, and a second UL power change capability indication associated with a second CC operating in accordance with a second tone spacing that is different than the first tone spacing.

In some aspects, the UL power change capability indication is defined per a group of component carriers (CCs).

In some aspects, each CC in the group of CCs is associated with the same tone spacing.

In some aspects, the UL power change capability indication is received in association with an Attach procedure between the UE and the base station.

In some aspects, the at least one processor is further configured to: transmit, to the UE, a request for the UL power change capability indication, wherein the UL power change capability indication is received in response to the request.

In some aspects, the one or more UL power changes are associated with different channels of the same beam.

In some aspects, the different channels comprise a physical uplink control channel (PUCCH) and a physical uplink shared channel (PUSCH) over the same beam to a given transmission reception point (TRP), or the different channels are associated with different TRPs over the same beam.

In an aspect, a user equipment (UE) includes: means for transmitting, to a base station, an uplink (UL) power change capability indication; and means for receiving, from the base station, scheduling information for one or more UL transmissions that include one or more UL power changes based on the UL power change capability indication.

In some aspects, the UL power change capability indication is transmitted via radio resource control (RRC) signaling.

In some aspects, the method includes means for transmitting, to the base station, a UL beam switch capability indication, wherein the UL beam switch capability indication is different than the UL power change capability indication.

In some aspects, the UL power change capability indication indicates a number of UL power changes that the UE is capable of performing during a given period of time.

In some aspects, the given period of time corresponds to a slot.

In some aspects, the slot is associated with a tone spacing, and the number of UL power changes that the UE is capable of performing during the slot scales inversely with respect to the tone spacing.

In some aspects, the UL power change capability indication is defined per component carrier (CC).

In some aspects, the UL power change capability indication comprises a first UL power change capability indication associated with a first CC operating in accordance with a first tone spacing, and a second UL power change capability indication associated with a second CC operating in accordance with a second tone spacing that is different than the first tone spacing.

In some aspects, the UL power change capability indication is defined per a group of component carriers (CCs).

In some aspects, each CC in the group of CCs is associated with the same tone spacing.

In some aspects, the UL power change capability indication is transmitted in association with an Attach procedure between the UE and the base station.

In some aspects, the method includes means for receiving, from the base station, a request for the UL power change capability indication, wherein the UL power change capability indication is transmitted in response to the request.

In some aspects, the one or more UL power changes are associated with different channels of the same beam.

In some aspects, the different channels comprise a physical uplink control channel (PUCCH) and a physical uplink shared channel (PUSCH) over the same beam to a given transmission reception point (TRP), or the different channels are associated with different TRPs over the same beam.

In an aspect, a base station includes: means for receiving, from a user equipment (UE), an uplink (UL) power change capability indication; and means for transmitting, to the UE, scheduling information for one or more UL transmissions that include one or more UL power changes based on the UL power change capability indication.

In some aspects, the UL power change capability indication is received via radio resource control (RRC) signaling.

In some aspects, the method includes means for receiving, from the UE, a UL beam switch capability indication, wherein the UL beam switch capability indication is different than the UL power change capability indication.

In some aspects, the UL power change capability indication indicates a number of UL power changes that the UE is capable of performing during a given period of time.

In some aspects, the given period of time corresponds to a slot.

In some aspects, the slot is associated with a tone spacing, and the number of UL power changes that the UE is capable of performing during the slot scales inversely with respect to the tone spacing.

In some aspects, the UL power change capability indication is defined per component carrier (CC).

In some aspects, the UL power change capability indication comprises a first UL power change capability indication associated with a first CC operating in accordance with a first tone spacing, and a second UL power change capability indication associated with a second CC operating in accordance with a second tone spacing that is different than the first tone spacing.

In some aspects, the UL power change capability indication is defined per a group of component carriers (CCs).

In some aspects, each CC in the group of CCs is associated with the same tone spacing.

In some aspects, the UL power change capability indication is received in association with an Attach procedure between the UE and the base station.

In some aspects, the method includes means for transmitting, to the UE, a request for the UL power change capability indication, wherein the UL power change capability indication is received in response to the request.

In some aspects, the one or more UL power changes are associated with different channels of the same beam.

In some aspects, the different channels comprise a physical uplink control channel (PUCCH) and a physical uplink shared channel (PUSCH) over the same beam to a given transmission reception point (TRP), or the different channels are associated with different TRPs over the same beam.

In an aspect, a non-transitory computer-readable medium storing a set of instructions includes one or more instructions that, when executed by one or more processors of a user equipment (UE), cause the UE to: transmit, to a base station, an uplink (UL) power change capability indication; and receive, from the base station, scheduling information for one or more UL transmissions that include one or more UL power changes based on the UL power change capability indication.

In some aspects, the UL power change capability indication is transmitted via radio resource control (RRC) signaling.

In some aspects, the one or more instructions further cause the UE to: transmit, to the base station, a UL beam switch capability indication, wherein the UL beam switch capability indication is different than the UL power change capability indication.

In some aspects, the UL power change capability indication indicates a number of UL power changes that the UE is capable of performing during a given period of time.

In some aspects, the given period of time corresponds to a slot.

In some aspects, the slot is associated with a tone spacing, and the number of UL power changes that the UE is capable of performing during the slot scales inversely with respect to the tone spacing.

In some aspects, the UL power change capability indication is defined per component carrier (CC).

In some aspects, the UL power change capability indication comprises a first UL power change capability indication associated with a first CC operating in accordance with a first tone spacing, and a second UL power change capability indication associated with a second CC operating in accordance with a second tone spacing that is different than the first tone spacing.

In some aspects, the UL power change capability indication is defined per a group of component carriers (CCs).

In some aspects, each CC in the group of CCs is associated with the same tone spacing.

In some aspects, the UL power change capability indication is transmitted in association with an Attach procedure between the UE and the base station.

In some aspects, the one or more instructions further cause the UE to: receive, from the base station, a request for the UL power change capability indication, wherein the UL power change capability indication is transmitted in response to the request.

In some aspects, the one or more UL power changes are associated with different channels of the same beam.

In some aspects, the different channels comprise a physical uplink control channel (PUCCH) and a physical uplink shared channel (PUSCH) over the same beam to a given transmission reception point (TRP), or the different channels are associated with different TRPs over the same beam.

In an aspect, a non-transitory computer-readable medium storing a set of instructions includes one or more instructions that, when executed by one or more processors of a base station, cause the base station to: receive, from a user equipment (UE), an uplink (UL) power change capability indication; and transmit, to the UE, scheduling information for one or more UL transmissions that include one or more UL power changes based on the UL power change capability indication.

In some aspects, the UL power change capability indication is received via radio resource control (RRC) signaling.

In some aspects, the one or more instructions further cause the base station to: receive, from the UE, a UL beam switch capability indication, wherein the UL beam switch capability indication is different than the UL power change capability indication.

In some aspects, the UL power change capability indication indicates a number of UL power changes that the UE is capable of performing during a given period of time.

In some aspects, the given period of time corresponds to a slot.

In some aspects, the slot is associated with a tone spacing, and the number of UL power changes that the UE is capable of performing during the slot scales inversely with respect to the tone spacing.

In some aspects, the UL power change capability indication is defined per component carrier (CC).

In some aspects, the UL power change capability indication comprises a first UL power change capability indication associated with a first CC operating in accordance with a first tone spacing, and a second UL power change capability indication associated with a second CC operating in accordance with a second tone spacing that is different than the first tone spacing.

In some aspects, the UL power change capability indication is defined per a group of component carriers (CCs).

In some aspects, each CC in the group of CCs is associated with the same tone spacing.

In some aspects, the UL power change capability indication is received in association with an Attach procedure between the UE and the base station.

In some aspects, the one or more instructions further cause the base station to: transmit, to the UE, a request for the UL power change capability indication, wherein the UL power change capability indication is received in response to the request.

In some aspects, the one or more UL power changes are associated with different channels of the same beam.

In some aspects, the different channels comprise a physical uplink control channel (PUCCH) and a physical uplink shared channel (PUSCH) over the same beam to a given transmission reception point (TRP), or the different channels are associated with different TRPs over the same beam.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
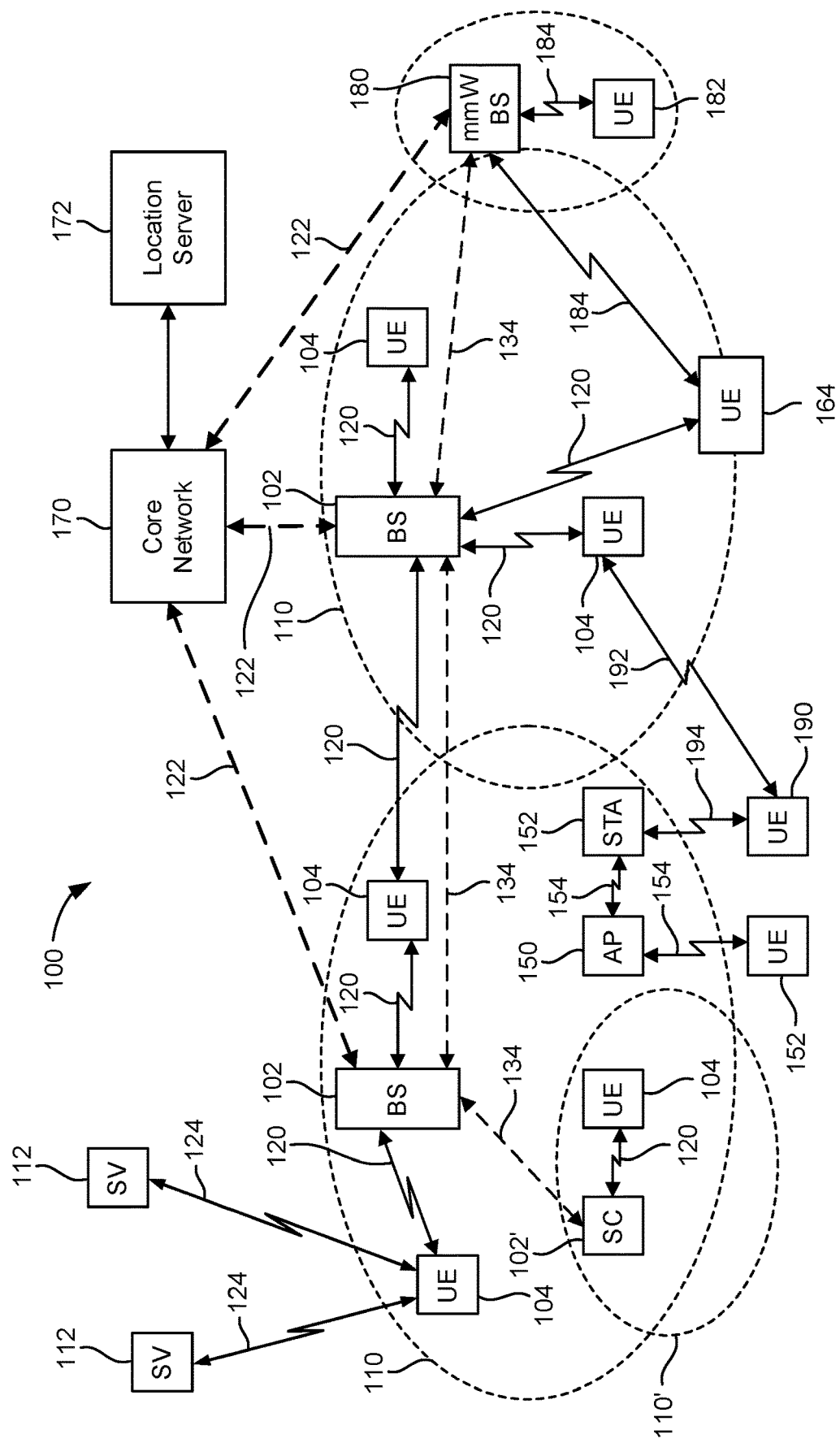
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
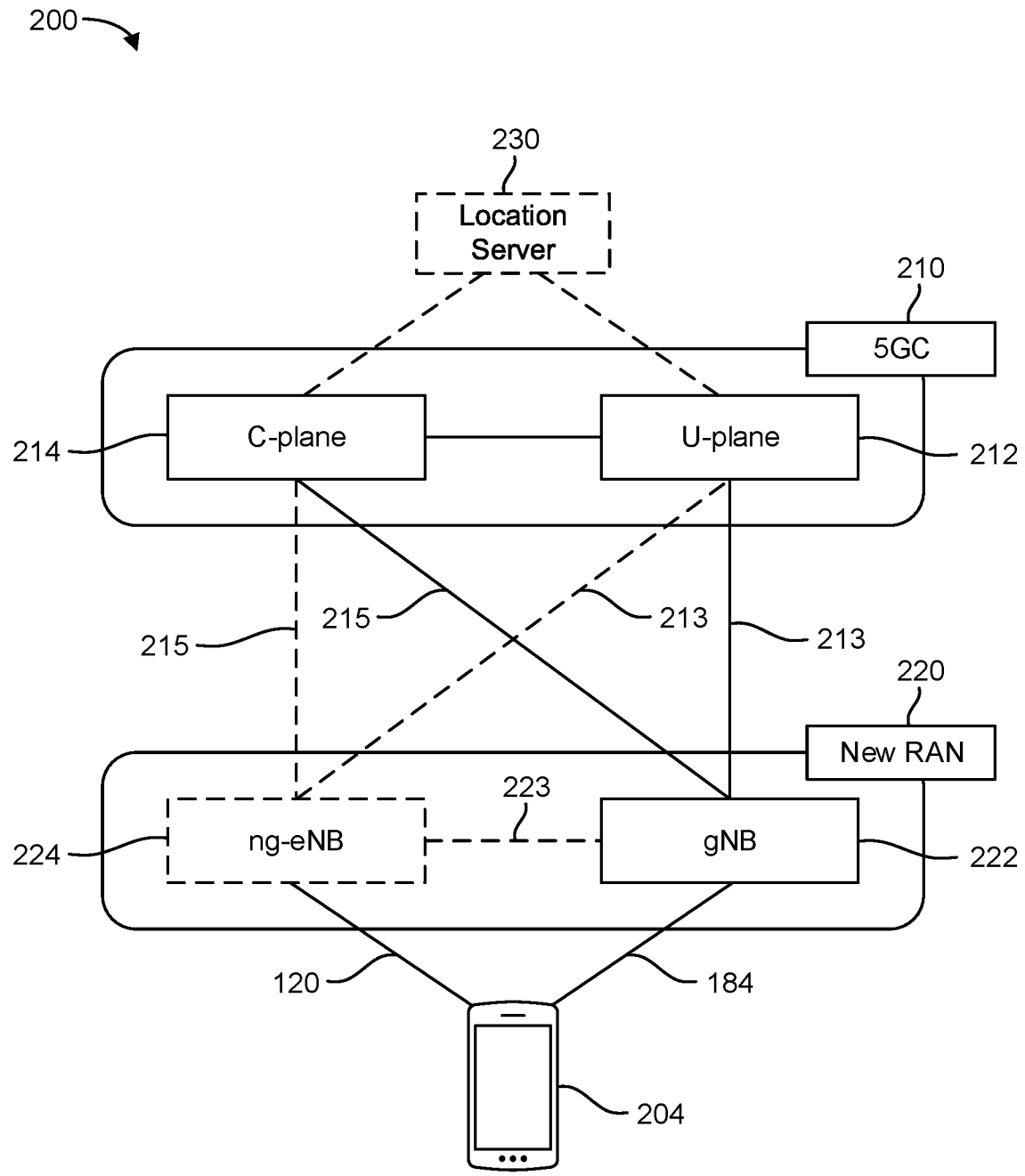
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
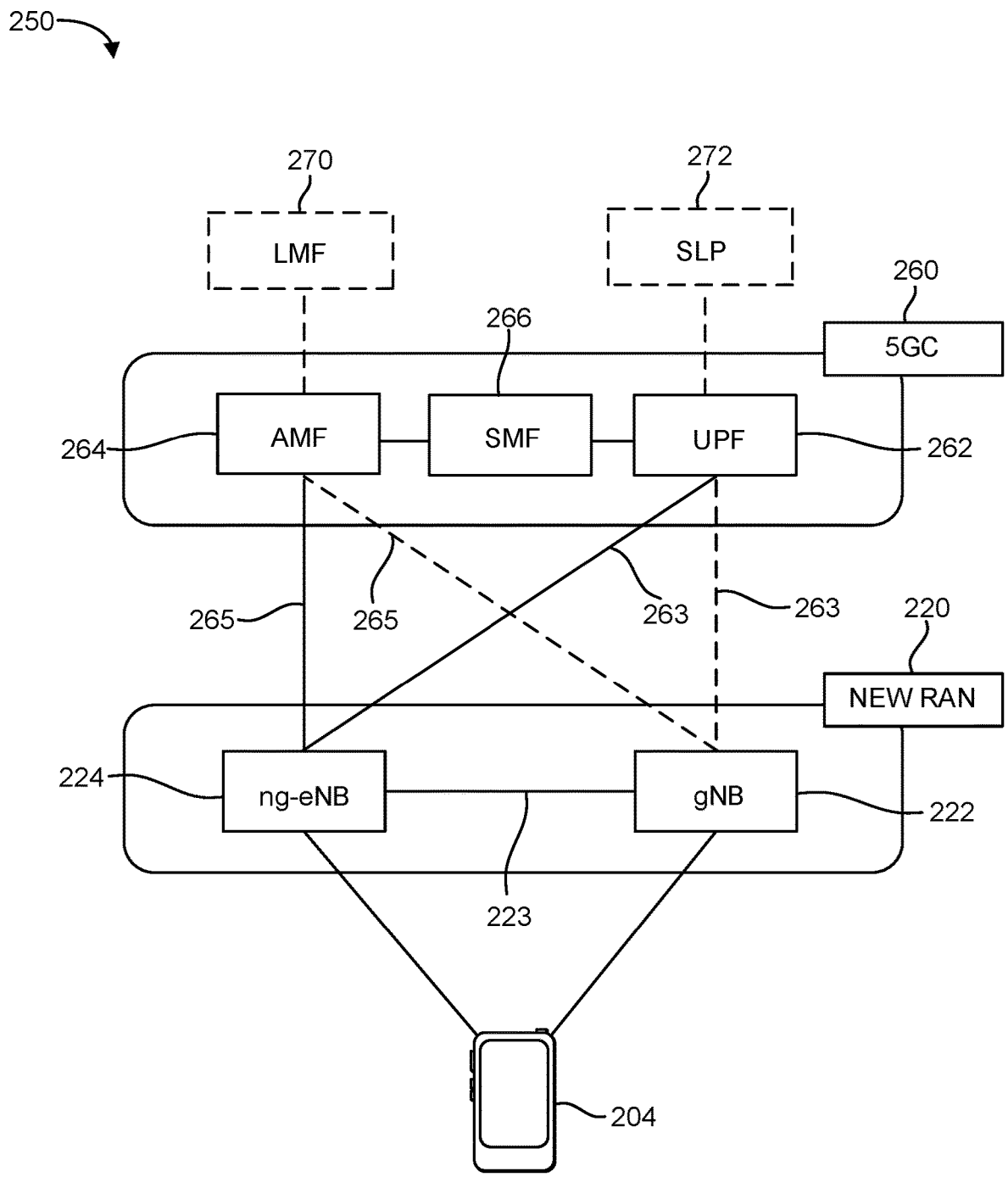

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
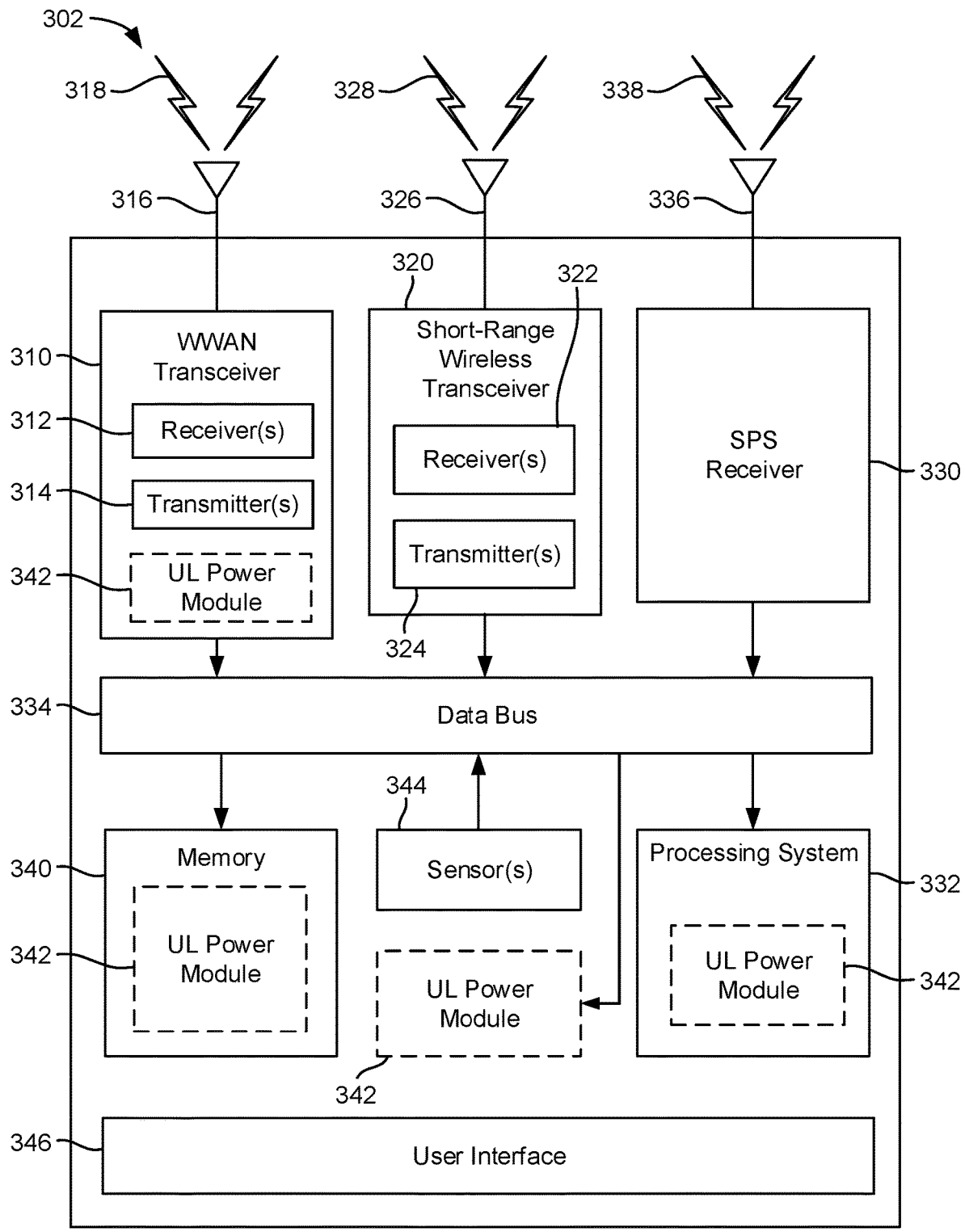
FIGS. 3A to 3C are simplified block diagrams of several sample aspects of components that may be employed in a user equipment (UE), a base station, and a network entity, respectively, and configured to support communications as taught herein.
Figure 3B:
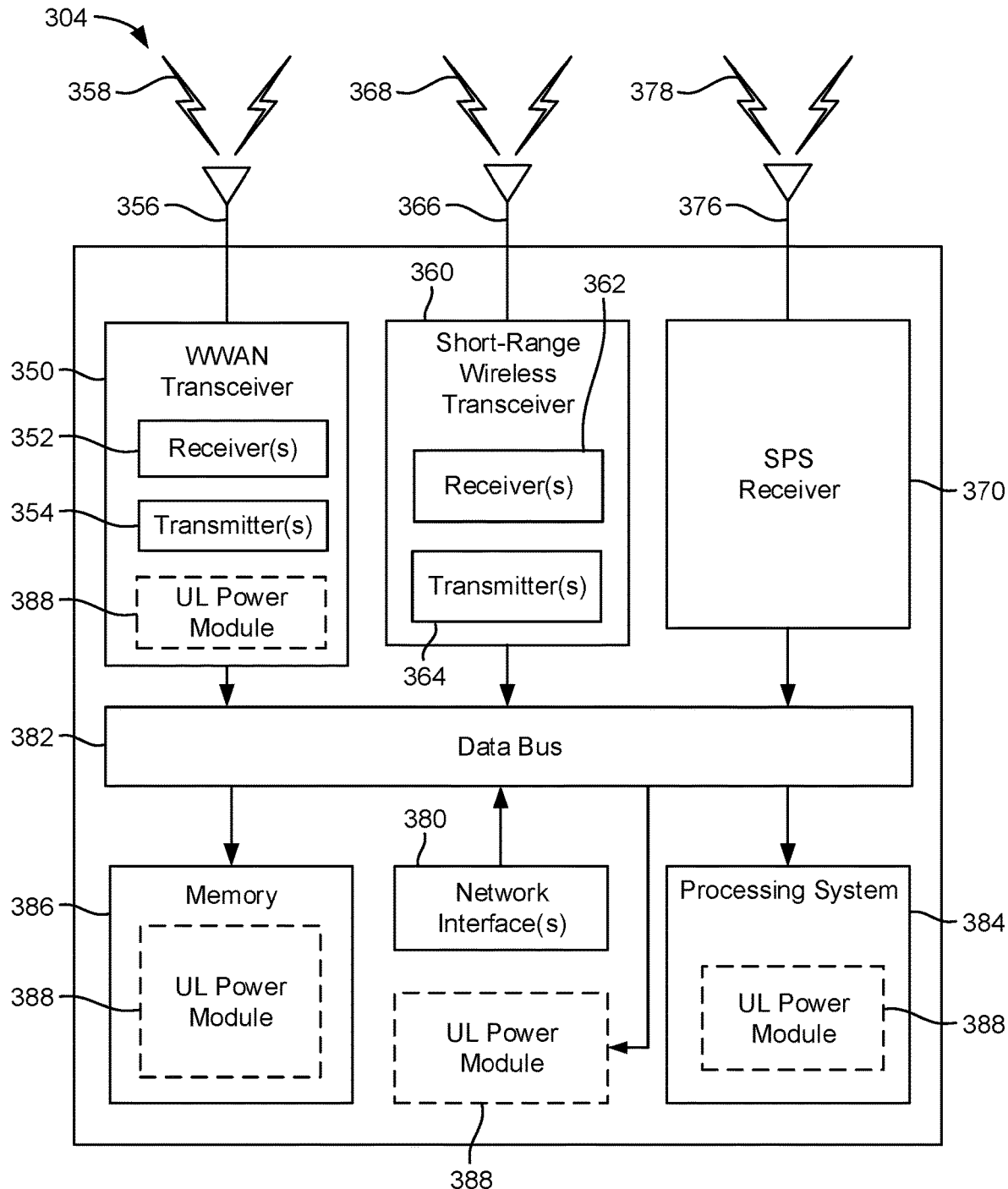
Figure 3C:
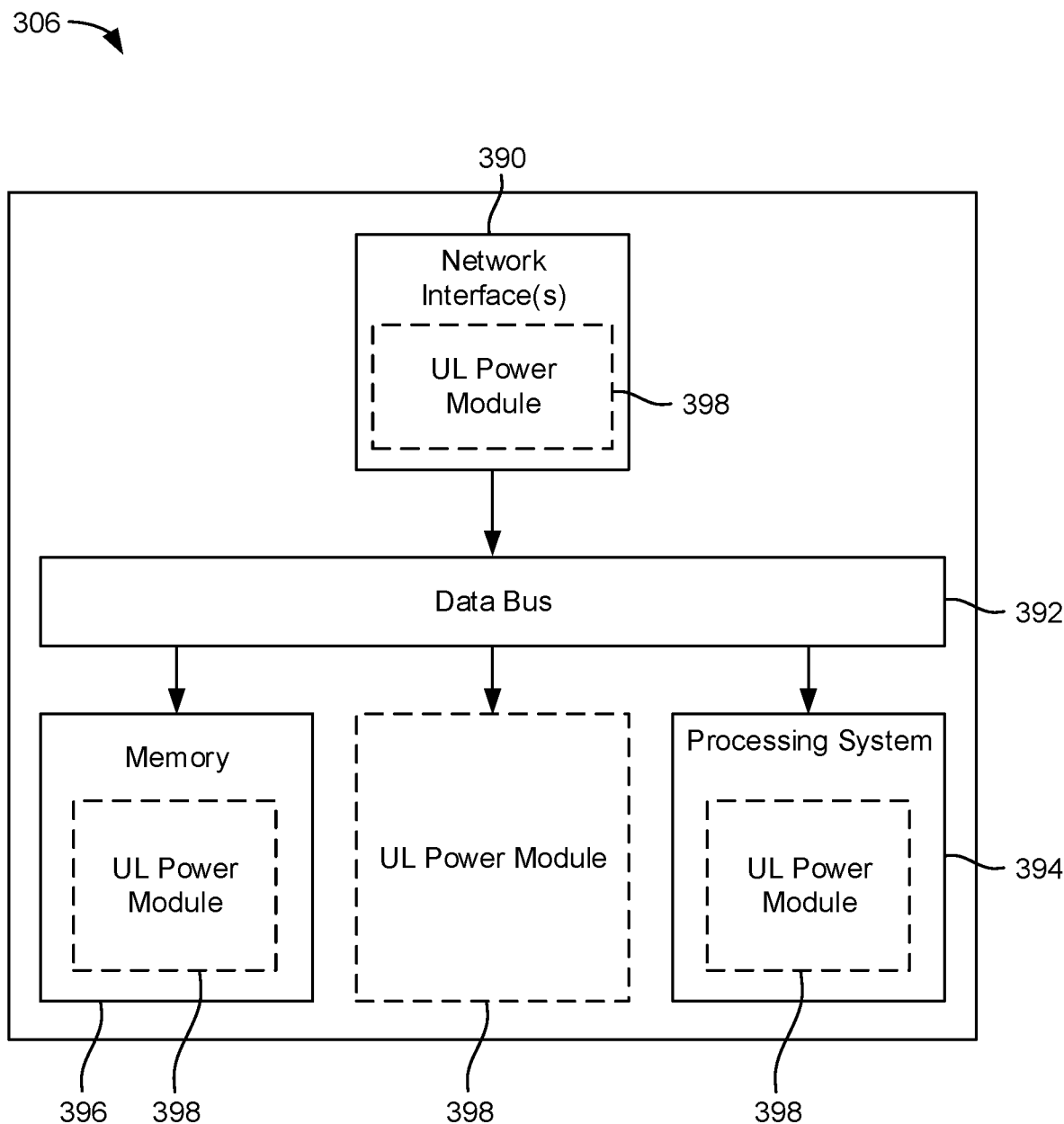

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include reference signal for UL Power Modules 342, 388, and 398, respectively. The UL Power Modules 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the UL Power Modules 342, 388, and 398 may be external to the processing systems 332, 384, and 394 (e.g., part of a modem processing system, integrated with another processing system, etc.). Alternatively, the UL Power Modules 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the UL Power Module 342, which may be part of the WWAN transceiver 310, the memory component 340, the processing system 332, or any combination thereof, or may be a standalone component. FIG. 3B illustrates possible locations of the UL Power Module 388, which may be part of the WWAN transceiver 350, the memory component 386, the processing system 384, or any combination thereof, or may be a standalone component. FIG. 3C illustrates possible locations of the UL Power Module 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304

(e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the UL Power Modules 342, 388, and 398, etc.

In 3GPP Rel. 15 and Rel. 16, UE reports certain parameters of its RF components as UE capability to a serving gNB. The serving gNB then makes scheduling decisions based on the reported UE capability. In mmW band (a.k.a., FR2), the serving gNB may schedule uplink transmissions for a UE at different beams (transmission configuration indicator (TCI) states, which may have special QCL-relationships, etc.). In some designs, the serving gNB may schedule the uplink transmissions based in part upon a UE capability of a maximum number of beam switches that the UE can perform within a slot (e.g., the scheduled uplink transmissions are configured by the serving gNB so as not to exceed the maximum number of beam switches).

In 3GPP Rel. 15 and Rel. 16, spatial relationship information in a TCI state can indicate one beamformed channel for a single channel or reference signal (RS) at a time. Therefore, UL power changes generally occur due to beam switch, e.g., due to different pathlosses in different beams. The serving gNB may assume that the UE's capability to change its UL power is aligned with its capability to perform a beam switch. To change UL power, UE may need to change PA configuration within or across different panels.

In 3GPP Rel. 17, a TCI state can be used to indicate multiple UL channels or RSs, where each of the multiple channels or RSs may require different UL power. Different channels or RSs may be scheduled with at different UL power levels. Moreover, UL power changes may be more frequency than beam changes in 3GPP Rel. 17. For example, in 3GPP Rel. 17, a change in power configurations (e.g., parameters or RS) can be more dynamic (e.g., via DCI signaling) than in 3GPP Rel. 15 or 16. 3GPP Rel. 17 supports a UE capability indication for reporting a maximum UL beam switch parameter, denoted as maxNumberRxTxBeamSwitchDL, but does not support any mechanism for reporting of a UL power change capability. Rather, gNBs schedule UL power changes in accordance based on some UL power change capability assumption (e.g., some default maximum amount, or may set to maxNumberRxTxBeamSwitchDL similar to legacy operation in 3GPP Rel. 15 or 16 even though maxNumberRxTxBeamSwitchDL may not be representative of the true UE power change capability as noted above).

In 3GPP Rel. 17, three new types of TCI states have been introduced, which can be updated by DCI. The corresponding beam indication application time is counted either from the end of DCI or the end of acknowledgment to the DCI, e.g.:

Joint DL/UL common TCI state to indicate a common beam for at least one DL channel/RS plus at least one UL channel/RS, Separate DL common TCI state to indicate a common beam for at least two DL channel/RS, or Separate UL common TCI state to indicate a common beam for at least two UL channel/RS In 3GPP Rel. 17, a beam indication signaling medium is provided to support joint or separate DL/UL beam indication unified TCI framework; namely, support L1-based beam indication using at least UE-specific (unicast) DCI to indicate joint or separate DL/UL beam indication from the active TCI states.

In 3GPP Rel. 17, regarding application time of the DCI-based beam indication, if a beam indication is received, the UE is to down-select from the following:

Alt1: the first slot that is at least X ms or Y symbols after the DCI with the joint or separate DL/UL beam indication, or Alt2: the first slot that is at least X ms or Y symbols after the acknowledgment of the joint or separate DL/UL beam indication.

Aspects of the disclosure are thereby directed to a UL power change capability indication transmitted by a UE to a gNB (or base station). Such aspects may provide various technical advantages, such as permitting a higher rate of UL power changes (e.g., higher than a respective beam switch capability for that UE) or avoiding scheduling of UL power changes that exceed a respective UE's capability to change its UL power. Such aspects may provide particular benefit in scenarios where a respective UE's beam switch capability differs from the respective UE's UL power change capability.

Figure 4:
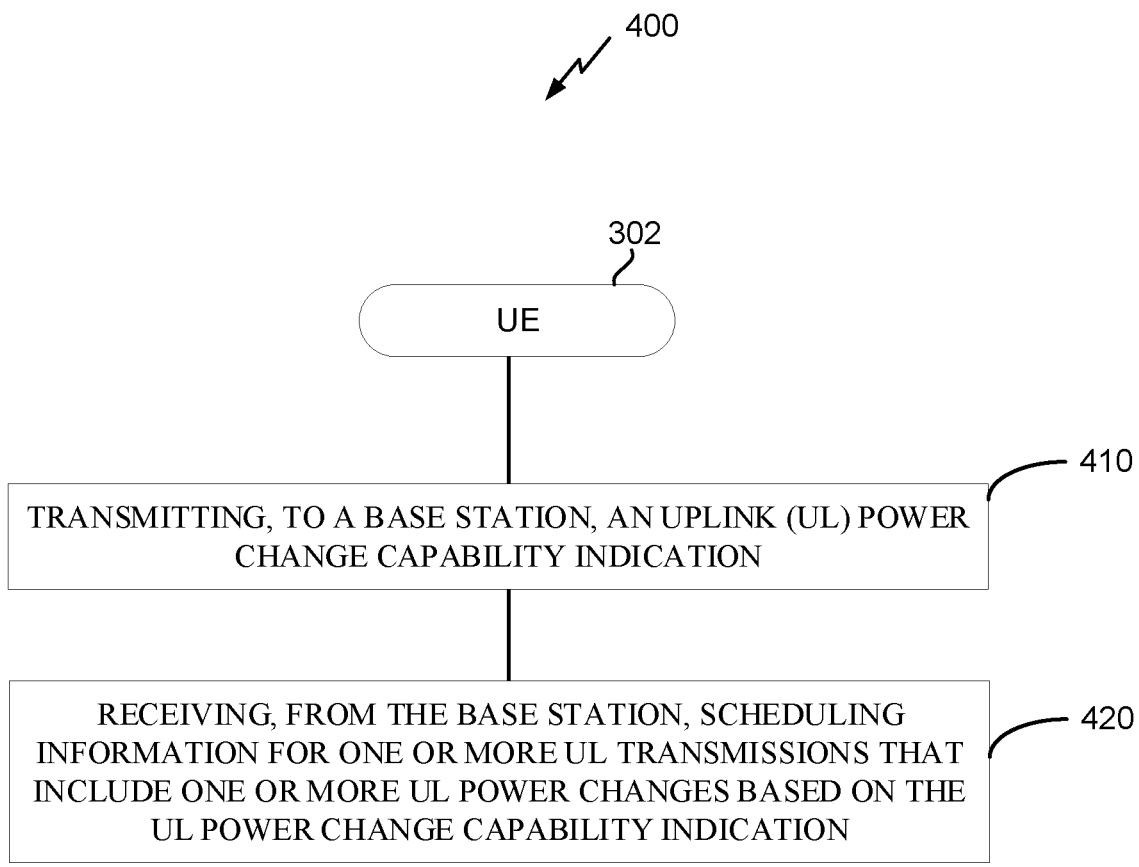
FIG. 4 illustrates an exemplary process of wireless communication, according to aspects of the disclosure.

FIG. 4 illustrates an exemplary process 400 of wireless communication, according to aspects of the disclosure. In an aspect, the process 400 may be performed by UE 302.

At 410, UE 302 (e.g., transmitter 314 or 324, etc.) transmits, to a base station, an uplink (UL) power change capability indication. In some designs, the UL power change capability information may be transmitted during an initial Attach between UE 302 and the base station. In some designs, the UL power change capability information may be transmitted via RRC signaling. In some designs, the UL power change capability information may be transmitted in response to a request from the base station for the UL power change capability indication (e.g., during the Attach procedure, or at some other time).

At 420, UE 302 (e.g., receiver 312 or 322, etc.) receives, from the base station, scheduling information for one or more UL transmissions that include one or more UL power changes based on the UL power change capability indication. For example, the UL power change capability indication may indicate a number (e.g., a maximum number) of UL power changes that the UE is capable of performing during a given period of time (e.g., slot, etc.). In this case, the scheduling information may schedule the UL transmissions such that the one or more UL power changes do not exceed indicated number of UL power changes from the UL power change capability indication.

Figure 5:
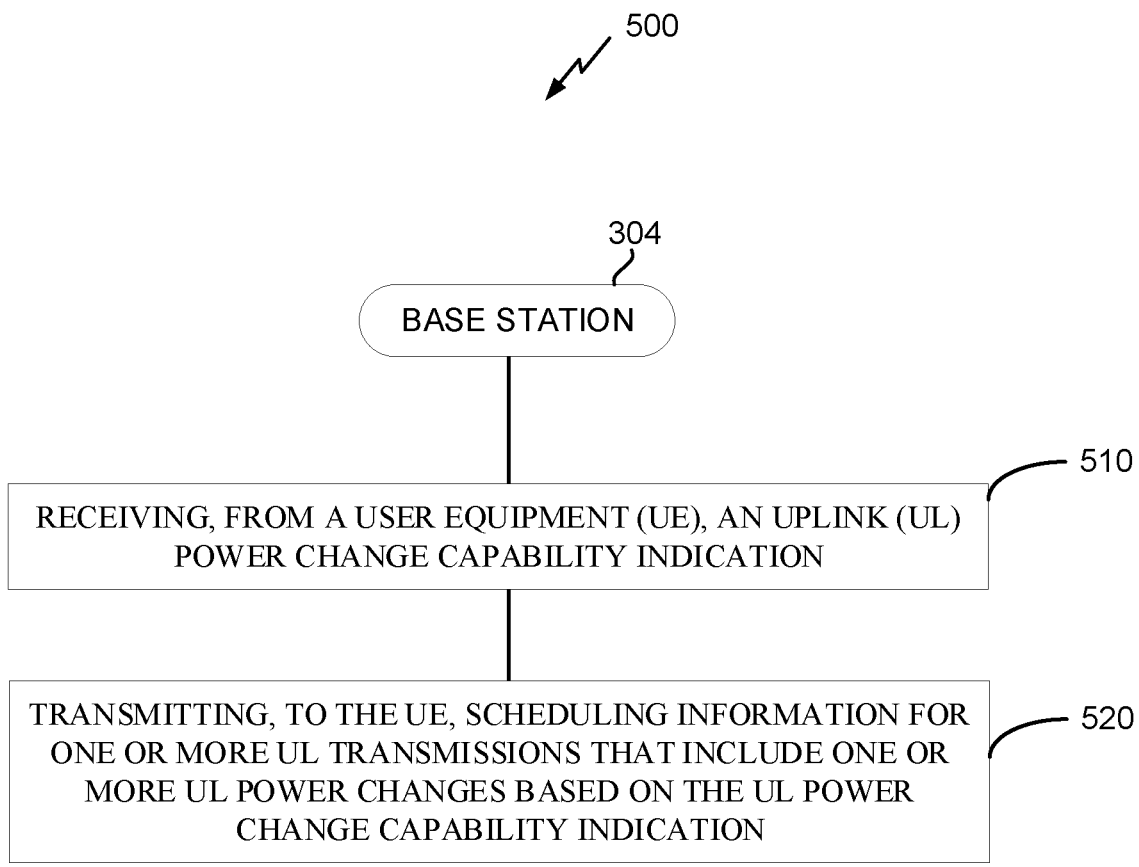
FIG. 5 illustrates an exemplary process of wireless communication, according to aspects of the disclosure.

FIG. 5 illustrates an exemplary process 500 of wireless communication, according to aspects of the disclosure. In an aspect, the process 500 may be performed by BS 304.

At 510, BS 304 (e.g., receiver 352 or 362, etc.) receives, from a user equipment (UE), an uplink (UL) power change capability indication. In some designs, the UL power change capability information may be received during an initial Attach between the UE and the base station. In some designs, the UL power change capability information may be received via RRC signaling. In some designs, the UL power change capability information may be received in response to a request from the base station for the UL power change capability indication (e.g., during the Attach procedure, or at some other time).

At 520, BS 304 (e.g., transmitter 354 or 364, etc.) transmits, to the UE, scheduling information for one or more UL transmissions that include one or more UL power changes based on the UL power change capability indication. For example, the UL power change capability indication may indicate a number (e.g., a maximum number) of UL power changes that the UE is capable of performing during a given period of time (e.g., slot, etc.). In this case, the scheduling information may schedule the UL transmissions such that the one or more UL power changes do not exceed indicated number of UL power changes from the UL power change capability indication.

Referring to FIGS. 4-5, in some designs as noted above, the UL power change capability indication is transported via RRC signaling.

Referring to FIGS. 4-5, in some designs, the UE may further transmit, to the base station, a UL beam switch capability indication (e.g., maxNumberRxTxBeamSwitchDL), and the UL beam switch capability indication is different than the UL power change capability indication. However, in other designs, it is possible for the UL power change capability indication to be the same as the beam switch capability indication (e.g., the UE can in theory be capable of the same number of beam switches as UL power changes across a given period of time, such as a slot).

Referring to FIGS. 4-5, in some designs as noted above, the UL power change capability indication may indicate a number (e.g., maximum number) of UL power changes that the UE is capable of performing during a given period of time. In some designs, the given period of time corresponds to a slot. In some designs, the slot is associated with a tone spacing, and the number of UL power changes that the UE is capable of performing during the slot may scale inversely with respect to the tone spacing. For example, a larger tone spacing may correspond to smaller symbol length, and given a fixed number of symbols per slot (e.g., 14 symbols), a larger tone spacing may in turn correspond to smaller slot length. In some designs, tone spacings of 60, 120, 240, 480, 960 kHz are supported, and the number of UL power changes per slot can be defined to accommodate the supported tone space. In some designs, per reference slot duration, the reference slot length may be defined by the lowest or highest supported tone spacing, or a fixed tone spacing (e.g., 120 kHz).

Referring to FIGS. 4-5, in some designs, the UL power change capability indication may be defined per component carrier (CC). For example, defining the UL power change capability indication (e.g., an RRC parameter for each CC) per CC may permit flexibility in case of different CCs being associated with different tone spacings (e.g., different slot sizes). For example, the UL power change capability indication comprises a first UL power change capability indication associated with a first CC operating in accordance with a first tone spacing, and a second UL power change capability indication associated with a second CC operating in accordance with a second tone spacing that is different than the first tone spacing. In other designs, the UL power change capability indication may be defined per a group of CCs (e.g., a common RRC parameter for the group). For example, each CC in the group of CCs is associated with the same tone spacing (e.g., in which case the UL power change capability may be the same across the group of CCs).

Referring to FIGS. 4-5, in some designs, the one or more UL power changes are associated with different channels of the same beam. In other words, UL power changes may occur even where a beam switch is not performed, in contrast to legacy operation in 3GPP Rel. 15 and Rel. 16. In some designs, the different channels may include a physical uplink control channel (PUCCH) and a physical uplink shared channel (PUSCH) over the same beam to a given transmission reception point (TRP). For example, the pathloss of PUCCH and PUSCH can be different even where the same beam is used to the same TRP, which may result in a UL power change for PUCCH and PUSCH. In other designs, the different channels may be associated with different TRPs over the same beam. For example, the same beam can be used to target multiple TRPs in some designs (e.g., an LOS link and a NLOS link, etc.), with each channel to each TRP having a different respective pathloss, which may result in a UL power change for transmissions to the respective TRPs even where the same beam is used.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: transmitting, to a base station, an uplink (UL) power change capability indication; and receiving, from the base station, scheduling information for one or more UL transmissions that include one or more UL power changes based on the UL power change capability indication.

Clause 2. The method of clause 1, wherein the UL power change capability indication is transmitted via radio resource control (RRC) signaling.

Clause 3. The method of any of clauses 1 to 2, further comprising: transmitting, to the base station, a UL beam switch capability indication, wherein the UL beam switch capability indication is different than the UL power change capability indication.

Clause 4. The method of any of clauses 1 to 3, wherein the UL power change capability indication indicates a number of UL power changes that the UE is capable of performing during a given period of time.

Clause 5. The method of clause 4, wherein the given period of time corresponds to a slot.

Clause 6. The method of clause 5, wherein the slot is associated with a tone spacing, and wherein the number of UL power changes that the UE is capable of performing during the slot scales inversely with respect to the tone spacing.

Clause 7. The method of any of clauses 1 to 6, wherein the UL power change capability indication is defined per component carrier (CC).

Clause 8. The method of clause 7, wherein the UL power change capability indication comprises a first UL power change capability indication associated with a first CC operating in accordance with a first tone spacing, and a second UL power change capability indication associated with a second CC operating in accordance with a second tone spacing that is different than the first tone spacing.

Clause 9. The method of any of clauses 1 to 8, wherein the UL power change capability indication is defined per a group of component carriers (CCs).

Clause 10. The method of clause 9, wherein each CC in the group of CCs is associated with the same tone spacing.

Clause 11. The method of any of clauses 1 to 10, wherein the UL power change capability indication is transmitted in association with an Attach procedure between the UE and the base station.

Clause 12. The method of any of clauses 1 to 11, further comprising: receiving, from the base station, a request for the UL power change capability indication, wherein the UL power change capability indication is transmitted in response to the request.

Clause 13. The method of any of clauses 1 to 12, wherein the one or more UL power changes are associated with different channels of the same beam.

Clause 14. The method of clause 13, wherein the different channels comprise a physical uplink control channel (PUCCH) and a physical uplink shared channel (PUSCH) over the same beam to a given transmission reception point (TRP), or wherein the different channels are associated with different TRPs over the same beam.

Clause 15. A method of operating a base station, comprising: receiving, from a user equipment (UE), an uplink (UL) power change capability indication; and transmitting, to the UE, scheduling information for one or more UL transmissions that include one or more UL power changes based on the UL power change capability indication.

Clause 16. The method of clause 15, wherein the UL power change capability indication is received via radio resource control (RRC) signaling.

Clause 17. The method of any of clauses 15 to 16, further comprising: receiving, from the UE, a UL beam switch capability indication, wherein the UL beam switch capability indication is different than the UL power change capability indication.

Clause 18. The method of any of clauses 15 to 17, wherein the UL power change capability indication indicates a number of UL power changes that the UE is capable of performing during a given period of time.

Clause 19. The method of clause 18, wherein the given period of time corresponds to a slot.

Clause 20. The method of clause 19, wherein the slot is associated with a tone spacing, and wherein the number of UL power changes that the UE is capable of performing during the slot scales inversely with respect to the tone spacing.

Clause 21. The method of any of clauses 15 to 20, wherein the UL power change capability indication is defined per component carrier (CC).

Clause 22. The method of clause 21, wherein the UL power change capability indication comprises a first UL power change capability indication associated with a first CC operating in accordance with a first tone spacing, and a second UL power change capability indication associated with a second CC operating in accordance with a second tone spacing that is different than the first tone spacing.

Clause 23. The method of any of clauses 15 to 22, wherein the UL power change capability indication is defined per a group of component carriers (CCs).

Clause 24. The method of clause 23, wherein each CC in the group of CCs is associated with the same tone spacing.

Clause 25. The method of any of clauses 15 to 24, wherein the UL power change capability indication is received in association with an Attach procedure between the UE and the base station.

Clause 26. The method of any of clauses 15 to 25, further comprising: transmitting, to the UE, a request for the UL power change capability indication, wherein the UL power change capability indication is received in response to the request.

Clause 27. The method of any of clauses 15 to 26, wherein the one or more UL power changes are associated with different channels of the same beam.

Clause 28. The method of clause 27, wherein the different channels comprise a physical uplink control channel (PUCCH) and a physical uplink shared channel (PUSCH) over the same beam to a given transmission reception point (TRP), or wherein the different channels are associated with different TRPs over the same beam.

Clause 29. An apparatus comprising a memory and at least one processor communicatively coupled to the memory, the memory and the at least one processor configured to perform a method according to any of clauses 1 to 28.

Clause 30. An apparatus comprising means for performing a method according to any of clauses 1 to 28.

Clause 31. A non-transitory computer-readable medium storing computer-executable instructions, the computer-executable comprising at least one instruction for causing a computer or processor to perform a method according to any of clauses 1 to 28.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
    transmitting, to a wireless network component, an uplink (UL) power change capability indication; and
    receiving, from the wireless network component, scheduling information for one or more UL transmissions that include one or more UL power changes based on the UL power change capability indication,
    wherein the UL power change capability indication indicates a number of UL power changes that the UE is capable of performing during a slot, or
    wherein the UL power change capability indication is defined per component carrier (CC), or
    wherein the UL power change capability indication is defined per a group of component carriers (CCs), or
    wherein the UL power change capability indication is transmitted in association with an Attach procedure between the UE and the wireless network component, or
    wherein the one or more UL power changes are associated with different channels of the same beam, or
    any combination thereof.

2. The method of claim 1, wherein the UL power change capability indication is transmitted via radio resource control (RRC) signaling.

3. The method of claim 1, further comprising:
    transmitting, to the wireless network component, a UL beam switch capability indication,
    wherein the UL beam switch capability indication is different than the UL power change capability indication.

4. The method of claim 1, wherein the UL power change capability indication indicates the number of UL power changes that the UE is capable of performing during the slot.

5. The method of claim 4,
    wherein the slot is associated with a tone spacing, and
    wherein the number of UL power changes that the UE is capable of performing during the slot scales inversely with respect to the tone spacing.

6. The method of claim 1, wherein the UL power change capability indication is defined per CC.

7. The method of claim 6, wherein the UL power change capability indication comprises a first UL power change capability indication associated with a first CC operating in accordance with a first tone spacing, and a second UL power change capability indication associated with a second CC operating in accordance with a second tone spacing that is different than the first tone spacing.

8. The method of claim 1, wherein the UL power change capability indication is defined per the group of CCs.

9. The method of claim 8, wherein each CC in the group of CCs is associated with the same tone spacing.

10. The method of claim 1, wherein the UL power change capability indication is transmitted in association with the Attach procedure between the UE and the wireless network component.

11. The method of claim 1, further comprising:
    receiving, from the wireless network component, a request for the UL power change capability indication,
    wherein the UL power change capability indication is transmitted in response to the request.

12. The method of claim 1, wherein the one or more UL power changes are associated with the different channels of the same beam.

13. The method of claim 12,
wherein the different channels comprise a physical uplink control channel (PUCCH) and a physical uplink shared channel (PUSCH) over the same beam to a given transmission reception point (TRP), or
wherein the different channels are associated with different TRPs over the same beam.

14. A method of operating a wireless network component, comprising:
receiving, from a user equipment (UE), an uplink (UL) power change capability indication; and
transmitting, to the UE, scheduling information for one or more UL transmissions that include one or more UL power changes based on the UL power change capability indication,
wherein the UL power change capability indication indicates a number of UL power changes that the UE is capable of performing during a slot, or
wherein the UL power change capability indication is defined per component carrier (CC), or
wherein the UL power change capability indication is defined per a group of component carriers (CCs), or
wherein the UL power change capability indication is received in association with an Attach procedure between the UE and the wireless network component, or
wherein the one or more UL power changes are associated with different channels of the same beam, or
any combination thereof.

15. The method of claim 14, wherein the UL power change capability indication is received via radio resource control (RRC) signaling.

16. The method of claim 14, further comprising:
receiving, from the UE, a UL beam switch capability indication,
wherein the UL beam switch capability indication is different than the UL power change capability indication.

17. The method of claim 14, wherein the UL power change capability indication indicates the number of UL power changes that the UE is capable of performing during the slot.

18. The method of claim 17,
wherein the slot is associated with a tone spacing, and
wherein the number of UL power changes that the UE is capable of performing during the slot scales inversely with respect to the tone spacing.

19. The method of claim 14, wherein the UL power change capability indication is defined per CC.

20. The method of claim 19, wherein the UL power change capability indication comprises a first UL power change capability indication associated with a first CC operating in accordance with a first tone spacing, and a second UL power change capability indication associated with a second CC operating in accordance with a second tone spacing that is different than the first tone spacing.

21. The method of claim 14, wherein the UL power change capability indication is defined per the group of CCs.

22. The method of claim 21, wherein each CC in the group of CCs is associated with the same tone spacing.

23. The method of claim 14, wherein the UL power change capability indication is received in association with the Attach procedure between the UE and the wireless network component.

24. The method of claim 14, further comprising:
transmitting, to the UE, a request for the UL power change capability indication,
wherein the UL power change capability indication is received in response to the request.

25. The method of claim 14, wherein the one or more UL power changes are associated with the different channels of the same beam.

26. The method of claim 25,
wherein the different channels comprise a physical uplink control channel (PUCCH) and a physical uplink shared channel (PUSCH) over the same beam to a given transmission reception point (TRP), or
wherein the different channels are associated with different TRPs over the same beam.

27. A user equipment (UE), comprising:
at least one memory;
at least one transceiver; and
at least one processor communicatively coupled to the at least one memory and the at least one transceiver, the at least one processor configured to:
transmit, to a wireless network component, an uplink (UL) power change capability indication; and
receive, from the wireless network component, scheduling information for one or more UL transmissions that include one or more UL power changes based on the UL power change capability indication,
wherein the UL power change capability indication indicates a number of UL power changes that the UE is capable of performing during a slot, or
wherein the UL power change capability indication is defined per component carrier (CC), or
wherein the UL power change capability indication is defined per a group of component carriers (CCs), or
wherein the UL power change capability indication is transmitted in association with an Attach procedure between the UE and the wireless network component, or
wherein the one or more UL power changes are associated with different channels of the same beam, or
any combination thereof.

28. A wireless network component, comprising:
at least one memory;
at least one transceiver; and
at least one processor communicatively coupled to the memory and the at least one transceiver, the at least one processor configured to:
receive, from a user equipment (UE), an uplink (UL) power change capability indication; and
transmit, to the UE, scheduling information for one or more UL transmissions that include one or more UL power changes based on the UL power change capability indication,
wherein the UL power change capability indication indicates a number of UL power changes that the UE is capable of performing during a slot, or
wherein the UL power change capability indication is defined per component carrier (CC), or
wherein the UL power change capability indication is defined per a group of component carriers (CCs), or
wherein the UL power change capability indication is received in association with an Attach procedure between the UE and the wireless network component, or
wherein the one or more UL power changes are associated with different channels of the same beam, or
any combination thereof.

* * * * *